United States Patent
Stephen et al.

(10) Patent No.: US 7,534,462 B2
(45) Date of Patent: May 19, 2009

(54) BEVERAGE THICKENER SYSTEM, BEVERAGE AND METHOD

(75) Inventors: Jeanette Stephen, Arlington Heights, IL (US); Renee Mellican, Lake Zurich, IL (US); Bryan Hitchcock, Vernon Hills, IL (US); Kristin Parshall, Algonquin, IL (US); Nicholas Shields, Crystal Lake, IL (US)

(73) Assignee: Tropicana Products, Inc., Bradenton, FL (US)

( * ) Notice: Subject to any disclaimer, the term of this patent is extended or adjusted under 35 U.S.C. 154(b) by 733 days.

(21) Appl. No.: 11/021,761

(22) Filed: Dec. 23, 2004

(65) Prior Publication Data

US 2006/0141127 A1 Jun. 29, 2006

(51) Int. Cl.
*A23L 2/52* (2006.01)

(52) U.S. Cl. .................. 426/590; 426/578; 426/575

(58) Field of Classification Search .............. 426/590, 426/599, 573–579

See application file for complete search history.

(56) References Cited

U.S. PATENT DOCUMENTS

| | | | | |
|---|---|---|---|---|
| 2,599,510 | A * | 6/1952 | Campbell, Jr. et al. | 84/680 |
| 2,764,486 | A * | 9/1956 | Stevens et al. | 426/590 |
| 3,395,021 | A * | 7/1968 | Glicksman et al. | 426/98 |
| 3,973,051 | A * | 8/1976 | Buckley et al. | 426/574 |
| 4,084,012 | A * | 4/1978 | Krumel et al. | 426/590 |
| 4,279,940 | A * | 7/1981 | Wurzburg et al. | 426/590 |
| 4,349,577 | A * | 9/1982 | Tessler | 426/590 |
| 4,529,613 | A * | 7/1985 | Mezzino et al. | 426/590 |
| 4,838,944 | A | 6/1989 | Kruger | |
| 6,033,713 | A | 3/2000 | Sheldon | |
| 6,200,623 | B1 | 3/2001 | Dudacek et al. | |
| 6,506,427 | B1 * | 1/2003 | Garti et al. | 426/51 |
| 6,576,285 | B1 | 6/2003 | Bader et al. | |
| 6,759,073 | B2 * | 7/2004 | Heisey et al. | 426/573 |
| 6,838,109 | B2 * | 1/2005 | Nunes et al. | 426/575 |
| 2005/0009153 | A1 | 1/2005 | Sugiyama et al. | |

OTHER PUBLICATIONS

Sreenath, H. et al. 1995. . Journal of Fermentation and Bioengineering 80(2)190-194.*
Symrise GmbH & Co. KG, Symrise-Flavors, Fragrances, Aroma Chemicals, Primary and Active Cosmetic.
Ingredients, www.foodprocessing-technology.com/company_printable.asp?ProductSubGroupID, pp. 1-3.
Symrise GmbH & Co. KG, Beverages, Flavors, www.symrise.com/en/flavors/index.php, p. 1.
Symrise GmbH & Co. KG, Beverages, New Ways to Quench Your Thirst, www.symrise.com/en/flavors/print.php?page1=beverages.php, pp. 1-3.
Symrise GmbH & Co. KG, Beverages-Citrus, Sparkling and Fresh, www.symrise.com/en/flavors/print.php?page1=citrus.php, pp. 1-3.
Symrise GmbH & Co. KG, Glossary, From A to Z, www.symrise.com/en/flavors/print.php?page1=glossary.php, pp. 1-4.
Missouri Families, Food and Fitness, Quick Answers, http://missourifamilies.org/quick/nutritionqa/nutqa54.htm, p. 1.
Food Starch Dictionary*m, Modified starch, http://www.foodstarch.com/dictionary/n.asp.
Food Starch Dictionary*c, Chemically-modified starch, http://www.foodstarch.com/dictionary/c.asp.
Food Starch Dictionary*p, Physically-modified starch, http://www.foodstarch.com/dictionary/p.asp.
Prepared Foods, Ingredients in Use: Modified Food Starch, www.preparedfoods.com/CDA/ArticleInformation/features/features/BNP_Features_Item/0,1231,113866, pp. 1-4.
Food Starch, Modified Food Starches: Why, What, Where and How, Joseph M. Light, National Starch and Chemical Co., Bridgewater, NJ, www.foodstarch.com/products_services/modified/pns_modified.asp, pp. 1-17.

* cited by examiner

*Primary Examiner*—Carolyn A Paden
(74) *Attorney, Agent, or Firm*—Banner & Witcoff, Ltd.

(57) ABSTRACT

The present invention relates to an improved beverage thickener system and beverage which achieve desired perceived viscosity levels and mouthfeel with reduced amounts of thickener while improving the mouthfeel characteristics of the beverage. The beverage and beverage thickener system comprise a thickener, preferably modified food starch, and a thickener adjuvant that is not a thickener. The weight ratio of modified food starch to thickener adjuvant typically is in the range of from about 40:1 to about 10:1.

18 Claims, No Drawings

BEVERAGE THICKENER SYSTEM, BEVERAGE AND METHOD

FIELD OF THE INVENTION

The present invention relates to an improved beverage thickener system, beverage and method. More particularly, the beverage thickener system can achieve desired viscosity levels with reduced amounts of thickener while improving mouthfeel characteristics in the resulting beverage.

BACKGROUND OF THE INVENTION

Known beverage thickeners (i.e. viscosity building agents) provide increased beverage viscosity. However, known beverage thickeners can result in a beverage that has a "slimy" or undesirable mouthfeel. "Mouthfeel" is a term that combines many of the sensations associated with the overall attributes of a beverage, such as the oiliness, smoothness, pulpiness, flavor release, flavor masking, texture, sliminess, body and chalkiness of the beverage. The mouthfeel of a beverage, including its flavor impact, may have a considerable impact on its commercial success. Thus, there is a need for beverages having an improved mouthfeel and flavor.

Additionally, known thickener systems can require a substantial amount of thickener to provide a beverage with a desired viscosity and mouthfeel. One drawback associated with incorporating relatively large amounts of thickener into a beverage is that it increases the cost of the beverage. Therefore, a need exists for an improved beverage thickener system which reduces the amount of thickener required to provide a beverage with a desired viscosity while achieving a desirable mouthfeel.

SUMMARY OF THE INVENTION

In accordance with the present invention, a novel beverage thickener system, beverage and method of thickening a beverage is provided. The beverage thickener system in accordance with the present invention is particularly suited for use in juice-type beverages. The inventive beverage thickener system is composed of two components, a thickener and a thickener adjuvant, that provide a synergistic effect and unexpected results. The thickener adjuvant is not a thickener or does not provide a significant actual viscosity increase by itself. The synergistic effects and unexpected results that are achieved by the beverage thickener system of the invention include obtaining desired perceived or apparent viscosity levels with reduced amounts of thickener while also improving mouthfeel characteristics of the resulting beverage. Thus, the beverage thickener system of the invention can provide a perception of increased viscosity or thickening with less thickener compared to use of the thickener without the thickener adjuvant ingredient. By "perception" is meant how a beverage feels in the mouth of a consumer who is drinking the beverage, i.e., mouthfeel.

In accordance with one aspect of the invention, the beverage thickener system is provided. The beverage thickener system includes at least one component selected from the group consisting of flours, gums, modified food starches and mixtures or combinations thereof. The beverage thickener system also includes a thickener adjuvant. Typically, the thickener adjuvant is present in an effective amount to achieve or to permit achieving a perceived viscosity in a beverage using less thickener compared to the amount of thickener needed to achieve that perceived viscosity without the presence of a thickener adjuvant.

In accordance with another aspect of the invention, the beverage thickener system is incorporated into a beverage to form a resulting beverage. The resulting beverage may be used in any aqueous beverage and is particularly suitable for juice-type beverages.

In accordance with yet another aspect of the invention, a method of reducing the amount of a thickener needed to provide a specified increase in perceived viscosity in a beverage is provided. The method includes incorporating into the beverage a thickener and a thickener adjuvant selected from the group consisting of citrus flavor, citrus oil, citrus peel and combinations or mixtures thereof. Typically, the thickener adjuvant will be present in an amount effective to permit achieving a perceived viscosity in a beverage using less thickener compared to that amount of thickener needed to achieve that perceived viscosity without the presence of the thickener adjuvant.

In accordance with one aspect of the present invention, the beverage thickener system comprises a thickener component, preferably a modified food starch, and a thickener adjuvant ingredient that improves the perceived thickening properties and mouthfeel of the thickener component and permits the use of less thickener to provide an equivalent viscosity compared to the use of the thickener without the thickener adjuvant. As used herein, the term "thickener adjuvant" does not include materials that provide any significant viscosity increase by themselves. Suitable thickener adjuvants may be selected from citrus flavor, citrus oil, citrus peel and combinations thereof. These materials can be derived from citrus fruit, as is well known to those skilled in the art, and thus can be a natural material.

The beverage thickener system may be combined with and mixed with any aqueous beverage system to form an aqueous beverage, preferably juice-type drinks, and more preferably not-from-concentrate orange juice.

In accordance with another aspect of the present invention, the thickener component may comprise a flour, which may be konjac flour, a gum, such as locust bean gum, guar gum, xanthan gum, acacia, for example, a modified starch, pectin, and mixtures thereof. In a preferred embodiment, the thickener component is a modified food starch which has been chemically or physically modified by any suitable method known in the art. Typically, the modified food starch has a molecular weight of at least about 10,000.

In accordance with another aspect of the present invention, in order to achieve the synergistic results of the present invention, including improved mouthfeel while reducing the amount of thickener required to achieve a desired apparent or perceived viscosity in a beverage, the thickener system has a weight ratio of modified food starch to the thickener adjuvant, preferably citrus flavor, typically is in the range of from about 40:1 to about 10:1, and preferably is about 17:1.

In accordance with yet another aspect of the present invention, there is provided a beverage comprising a thickening system as previously described comprising a thickener component and a thickener adjuvant. The beverage of the present invention also obtains desired apparent or perceived viscosity levels with reduced amounts of thickener while also improving mouthfeel characteristics of the resulting beverage through the combination of a thickening component, preferably modified food starch, and a thickener adjuvant, preferably citrus flavor.

Suitable thickener adjuvants may be natural or synthetic and can be selected from citrus flavor, citrus oil, citrus peel, and combinations thereof, as previously described. Thus, such material may be used as a thickener adjuvant in place of or in addition to other thickener adjuvants in accordance with the invention.

In accordance with another aspect of the present invention, the thickener component for the beverage may be selected from modified and unmodified starch, pectin, flour, such as konjac, gum, such as locust bean gum, guar gum, xanthan gum, acacia, for example, and mixtures thereof. Preferably, the thickener component is a modified, cold water soluble food starch, which has been chemically or physically modified, and which typically has a molecular weight of at least about 10,000 or more. An especially preferred starch is marketed under the trade name INSTANT TEXTRA® by National Starch and Chemical Corp. of Bridgewater, N.J. This material is a cold water soluble modified food starch derived from tapioca having a pH of about 6 and is resistant to acid, heat, and moderate shear.

In accordance with another aspect of the present invention, the recommended weight ratio of modified food starch to the thickener adjuvant, preferably citrus flavor, present in the beverage is typically in the range of from about 40:1 to about 10:1, and preferably is about 17:1.

Typically, the weight percent of the modified food starch in the beverage is in the range of from about 0.10 to about 2.0 weight percent of the total beverage, more typically from about 0.25 to about 1.0, and preferably about 0.5 weight percent. Additionally, the weight percent of the thickener adjuvant in the total beverage typically is present in an amount to provide the synergistic effect of reducing the amount of thickener required in the beverage while achieving a beverage with a desirable viscosity and mouthfeel. Generally, to achieve these effects, the thickener adjuvant, including when the thickener adjuvant is citrus flavor, is present in the range of from about 0.01 to about 0.10 weight percent of the total beverage, and more preferably about 0.03 weight percent.

Other advantages and features of the invention will become apparent from the following description.

DETAILED DESCRIPTION OF THE INVENTION

While this invention is susceptible of embodiment in many different forms, there is described in detail herein, several specific embodiments with the understanding that the present disclosure is to be considered as exemplifications of the principles of the invention and is not intended to limit the invention to the embodiments illustrated.

The present invention is directed to a novel beverage thickener system for use in beverages, and is particularly suitable for juice-type beverages. The inventive thickener system achieves desired apparent viscosity and unproved mouthfeel while achieving up to about a 50% or more reduction in the amount of thickener required, while providing a pleasant and a desirable mouthfeel.

The thickener components of the invention comprise a thickener component and a thickener adjuvant that improves the thickener properties of the modified food starch. Suitable thickener adjuvants may be selected from citrus flavor, citrus oil, citrus peel, and combinations and mixtures thereof.

A particularly suitable citrus flavor for use in accordance with the present invention may be obtained from Symrise, Inc. under the trade name Natural Flavor Citrus Peel Type or Natural Flavor, Peelieness Type. Other suitable citrus flavors for use in accordance with the invention may be obtained from the peel or pulp of citrus fruits. The peels of citrus fruits are known to include flavorful and aromatic oils, which are typically water insoluble and particularly potent. The pulps of citrus fruits typically contain other water soluble components generally having less flavor potency. Suitable citrus fruits for use in accordance with the invention include, but are not limited to, citron, grapefruits, oranges, mandarins, tangerines, lemons, and limes.

Suitable thickener components for use in accordance with the present invention are modified and unmodified starch, pectin, flour, such as konjac, gum, such as locust bean gum, guar gum, xanthan gum, acacia, and mixtures thereof. Preferably, the thickener component is a modified, cold water soluble food starch, which has been chemically or physically modified, and which typically has a molecular weight of at least about 10,000 or more. Preferably, the thickener component is a modified starch.

Suitable modified starches for use in accordance with the invention are typically modified to have a relatively narrow viscosity range to provide the beverage in which they are incorporated with a predictable thickness and are modified to be particularly resistant to gelatinization at ambient or cooler temperatures. The modified food starches may be from corn, wheat, potato, rice, or tapioca, or mixtures thereof.

Typically, the modified food starches are those which have been chemically modified, such as by any known methods of acid conversion, enzyme conversion, cross-linking, or by any other suitable method, known to one of ordinary skill in the art, for converting a starch material to provide a modified starch material having suitable resistance to gelatinization at ambient or lower temperatures, and which has a desirable viscosity when mixed in an aqueous solution. Alternatively, the modified food starch may also be one which has been physically modified by drum-drying, extrusion, spray drying, or heat/moisture treatment or any other suitable method known to one of ordinary skill in the art.

One particularly suitable modified starch for use in accordance with the invention is a tapioca-derived modified food starch available from National Starch and Chemical Corp., Bridgewater, N.J., under the trade name INSTANT-TEXTRA®. The INSTANT TEXTRA® product is cold water soluble, adds no taste to the mixture into which it is incorporated, is particularly resistant to gelling upon refrigeration compared to traditional pre-gelatinized starch, and has a stated molecular weight greater than about 10,000. Moreover, the INSTANT-TEXTRA® product enhances mouthfeel while it also increases the viscosity of the beverage mixture when mixed in the beverage solution.

The process of making a modified starch product of the INSTANT TEXTRA® type is disclosed in U.S. Pat. No. 4,838,944, which is incorporated by reference herein. The patent discloses a process of degrading granular starch material with hydrogen peroxide and a catalytic amount of manganese in an alkaline slurry to produce a modified food starch material. When in powder form, the modified starches suitable for the present invention typically have a particle size in the range of from about 40 microns to about 60 microns, but may be of any other suitable particle size for incorporating into a beverage.

In a preferred embodiment, the weight ratio of modified food starch to the thickener adjuvant, preferably citrus flavor, is typically in the range of from about 40:1 to about 10:1, and preferably is about 17:1.

The beverage thickener system in accordance with the present invention can be incorporated into aqueous beverage formulations of various types by any suitable method, and the components of the system may be added separately, together, or as a dry or liquid premix or concentrate. When used as a dry premix, the dry components may be blended together with other dry ingredients that will be incorporated into the beverage.

The beverage thickener system is particularly useful in not-from-concentrate orange juice to provide the final juice product with a desirable mouthfeel while reducing the amount of thickener needed in the beverage. However, it is contemplated that the beverage thickener system may be utilized in any type of beverage, and in particular citrus juice beverages, including but not limited to fruit flavored beverages having from 0 to 100% juice content. The thickener system may also be used in a liquid or dry beverage concentrate, if desired.

A not-from-concentrate orange juice or juice drink including the beverage thickener system of the present invention is typically produced by combining the beverage thickener system with filtered water, orange pulp, preservatives, and other ingredients as desired. Additional ingredients may be included in the beverage mixture as desired. Such ingredients include, for example, and not as a limitation of the invention, vitamins, preservatives, nutrients and minerals. Such ingredients may be selected from, as is known to those skilled in the art, for example, ascorbic acid, beta-carotene, tocopherol, magnesium phosphate, niacinamide (Vitamin B3), thiamine hydrochloride (vitamin B1), riboflavin (vitamin B2), and pyroxidine hydrochloride. Additionally, any suitable calcium source may be provided in the beverage, if desired, such as calcium hydroxide. Further additional ingredients may include sweeteners, which may be nutritive or non-nutritive and may be natural or synthetic, such as acesulfame potassium and/or sucralose, edible acids, such as citric acid and malic acid. If a sweetener is added to the beverage, it typically is added to achieve a desired level of sweetness in the final beverage.

In one embodiment, the weight percent of the modified food starch in the beverage is in the range of from about 0.10 and about 2.0 weight percent of the total beverage, more typically from about 0.25 to about 1.0, and preferably about 0.5 weight percent. The weight percent of the thickener adjuvant in the total beverage typically is present in the range of from about 0.01 to about 0.10 weight percent of the total beverage, and more preferably about 0.03 weight percent. The weight ratio of modified food starch to thickener adjuvant in the total beverage is typically in the range of from about 40:1 to about 10:1, and more preferably about 17:1.

The invention can be further illustrated by the following examples or preferred embodiments thereof, although it will be understood that these examples are included merely for purposes of illustration and are not intended to limit the scope of the application.

EXAMPLE 1

Calcium-Fortified Not-From-Concentrate Orange Juice Beverage

This example illustrates one embodiment of the present invention in a calcium-fortified beverage that includes a calcium component and a citrus flavor provided by Symrise, Inc. of Holzminden, Germany.

| Description | Amount (parts by weight) | Weight % |
|---|---|---|
| Orange Juice, water, flavoring, and preservatives | 8500 | 99.29 |
| Modified food starch | 43 | 0.50 |

-continued

| Description | Amount (parts by weight) | Weight % |
|---|---|---|
| Citrus flavor (Symrise) | 2.6 | 0.03 |
| Calcium hydroxide | 15 | 0.18 |
| Total | 8560.6 | 100.000 |

EXAMPLE 2

Not-From-Concentrate Orange Juice Beverage with Pulp

This example is a citrus beverage which is a not-from-concentrate orange juice beverage with orange pulp.

| Description | Amount (parts by weight) | Weight % |
|---|---|---|
| Orange juice, water, flavoring, and preservatives | 6900 | 80.56 |
| Orange pulp | 1620 | 18.91 |
| Modified food starch | 43 | 0.50 |
| Citrus flavor (Symrise) | 2.6 | 0.03 |
| Total | 8565.6 | 100.000 |

While the invention has been described with respect to certain preferred embodiments, it is to be understood that the invention is capable of numerous changes, modifications, and rearrangements without departing from the scope or spirit of the invention as defined in the claims.

We claim:

1. A beverage thickener system comprising: a thickener comprising at least one component selected from the group consisting of flours, gums, modified food starches, and mixtures thereof and a thickener adjuvant, present in an amount effective to permit achieving a mouthfeel in a beverage with less thickener compared to the amount of thickener needed to achieve that mouthfeel without the presence of the thickener adjuvant, wherein the weight ratio of the thickener to the thickener adjuvant is in the range of from about 40:1 to about 17:1.

2. The beverage thickener system of claim 1 wherein the thickener adjuvant is selected from the group consisting of citrus flavor, citrus oil, citrus peel, and combinations thereof.

3. The beverage thickener system of claim 1 wherein the thickener adjuvant is natural citrus flavor.

4. The beverage thickener system of claim 3 wherein the citrus flavor comprises citrus peel.

5. The beverage thickener system of claim 3 wherein the thickener is modified food starch.

6. The beverage thickener system of claim 5, wherein the modified food starch is modified food starch derived from tapioca.

7. A beverage comprising: a thickener component comprising at least one component selected from the group consisting of flours, gums, modified food starches, and mixtures thereof; and a thickener adjuvant, present in an amount effective to permit achieving a mouthfeel in a beverage with less thickener compared to the amount of thickener needed to achieve that mouthfeel without the presence of the thickener adjuvant, wherein the weight ratio of the thickener to the thickener adjuvant is in the range of from about 40:1 to about 17:1.

8. The beverage of claim 7 wherein the thickener adjuvant is selected from the group consisting of citrus flavor, citrus peel, citrus oil and combinations thereof 9. The beverage of claim 7 wherein the thickener adjuvant is natural citrus flavor.

10. The beverage of claim 9 wherein the citrus flavor is derived from citrus peel.

11. The beverage of claim 9 wherein the thickener is modified food starch.

12. The beverage of claim 11, wherein the modified food starch is modified food starch derived from tapioca.

13. The beverage of claim 12, wherein the modified food starch has a molecular weight of at least about 10,000.

14. The beverage of claim 9 wherein the weight percent of the modified food starch is present in an amount in the range of from about 0.1 to about 2.0 weight percent of the total beverage weight.

15. The beverage of claim 7 wherein the thickener is present in amount of from about 0.10% to about 2.0% and the thickener adjuvant is present in an amount of from about 0.01% to about 0.1%, all by weight relative to the total beverage weight.

16. A method of reducing the amount of a thickener needed to provide a specified increase in mouthfeel in a beverage, comprising: incorporating into the beverage a thickener and a thickener adjuvant selected from the group consisting of citrus flavor, citrus oil, citrus peel, and combinations thereof, wherein the weight ratio of the thickener to the thickener adjuvant is in the range of from about 40:1 to about 17:1.

17. The method of claim 16 wherein the thickener adjuvant is natural citrus flavor.

18. The method of claim 16 wherein the thickener is a modified starch.

* * * * *